United States Patent [19]

Desmond et al.

[11] Patent Number: 4,564,511
[45] Date of Patent: Jan. 14, 1986

[54] SYNTHESIS OF MOLECULAR SIEVING METALLOSILICATES USING HETEROPOLYMETALLATES

[75] Inventors: Michael J. Desmond, Cleveland Hts.; Frederick A. Pesa, Aurora, both of Ohio

[73] Assignee: The Standard Oil Company (Ohio), Cleveland, Ohio

[21] Appl. No.: 672,394

[22] Filed: Nov. 16, 1984

[51] Int. Cl.$^4$ ............................................. C01B 35/10
[52] U.S. Cl. .................................. 423/277; 423/326; 423/327; 423/328; 423/329; 423/330; 423/332; 423/333; 502/60; 502/61; 502/62; 502/66; 502/77
[58] Field of Search ............... 423/326, 277, 328, 329, 423/277; 502/60–62, 77, 202, 66

*Primary Examiner*—John Doll
*Assistant Examiner*—Jackson Leeds
*Attorney, Agent, or Firm*—J. G. Curatolo; L. W. Evans

[57] ABSTRACT

A method for preparing a molecular sieving metallosilicate is disclosed which comprises
(A) providing a mixture comprising: water; an oxide of silicon source; a mineralizing agent and/or synthesis directing agent; and a heteropolymetallate of the formula $$A_aL_lM_mJ_zO_y \cdot dH_2O$$

wherein

A is an ion selected from the group consisting of hydrogen; one or more of the Group I-A to VI-A or Group I-B to VI-B metals; one or more of the rare earth metals; ammonium, alkyl ammonium, alkyl phosphonium or alkyl arsonium; or a mixture of two or more thereof;

M is Zn, Ga, Ge, Ti, Cr, Mn, Fe, Co, B, Ni, Rh, Zr or a mixture of two or more thereof;

L is P, As, Si, Al, H or a mixture of two or more thereof;

J is Mo, W, V, Nb or a mixture of two or more thereof;

a is a number which when multiplied by the charge of A will result in balancing the charge on the complex within the brackets;

l is a number ranging from zero to about 20;

m is a number ranging from zero to about 20;

z is a number ranging from about 1 to about 50;

y is a number ranging from about 7 to about 150;

d is a number ranging from about zero to about 150; and (B) maintaining said mixture at a temperature of about 80° C. to about 300° C. for an effective period of to form said molecular sieving metallosilicate.

38 Claims, No Drawings

SYNTHESIS OF MOLECULAR SIEVING METALLOSILICATES USING HETEROPOLYMETALLATES

TECHNICAL FIELD

This invention relates to molecular sieves and, more particularly, to molecular sieving metallosilicates. Specifically, this invention relates to a process for preparing molecular sieving metallosilicates using heteropolymetallates.

BACKGROUND OF THE INVENTION

The term "molecular sieve" refers to a wide variety of crystalline materials of both natural and synthetic varieties which exhibit the property of acting as sieves on a molecular scale. A major class of molecular sieves are the crystalline aluminosilicates, although other crystalline materials are included in the broad definition. Examples of such other crystalline materials include coal, special active carbons, porous glass, microporous beryllium oxide powders, and layer silicates modified by exchange with organic cations. See, D. W. Breck, "Zeolite Molecular Sieves: Structure, Chemistry, and Use", John Wiley & Sons, 1974.

Zeolites are crystalline, hydrated, framework aluminosilicates which are based on a three-dimensional network of $AlO_4$ and $SiO_4$ tetrahedra linked to each other by sharing all of the oxygens.

Zeolites may be represented by the empirical formula

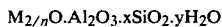

wherein, x is generally equal to or greater than 2 since $AlO_4$ tetrahedra are joined only to $SiO_4$ tetrahedra, and n is the cation valence. The framework contains channels and interconnected voids which are occupied by the cation, M, and water molecules. The cations may be mobile and exchangeable to varying degrees by other cations. Intracrystalline zeolitic water in many zeolites is removed continuously and reversibly. In many other zeolites, mineral and synthetic, cation exchange or dehydration may produce structural changes in the framework. Ammonium and alkylammonium cations may be incorporated in synthetic zeolites, e.g., $NH_4$, $CH_3NH_3$, $(CH_3)_2NH_2$, $(CH_3)_3NH$, and $(CH_3)_4N$. In some synthetic zeolites, aluminum cations may be substituted by gallium ions and silicon ions by germanium or phosphorus ions. The latter necessitates a modification of the structural formula.

The structural formula of a zeolite is best expressed for the crystallographic unit cell as: $M_{x/n}[(AlO_2)_x(SiO_2)_y]\cdot wH_2O$ where M is the cation of valence n, w is the number of water molecules and the ratio y/x usually has values of 1–100 depending upon the structure. The sum (x+y) is the total number of tetrahedra in the unit cell. The complex within the [ ] represents the framework composition.

The zeolites described in the patent literature and published journals are designated by letters or other convenient symbols. Exemplary of these materials are Zeolite A (U.S. Pat. No. 2,882,243), Zeolite X (U.S. Pat. No. 2,882,244), Zeolite Y (U.S. Pat. No. 3,130,007), Zeolite ZSM-5 (U.S. Pat. No. 3,702,886), Zeolite ZSM-11 (U.S. Pat. No. 3,709,979), and Zeolite ZSM-12 (U.S. Pat. No. 3,832,449).

Although there are 34 species of zeolite minerals and about 100 types of synthetic zeolites, only a few have been found to have practical significance. Many of the zeolites, after dehydration, are permeated by very small channel systems which are not interpenetrating and which may contain serious diffusion blocks. In other cases dehydration irreversibly disturbs the framework structure and the positions of metal cations, so that the structure partially collapses and dehydration is not completely reversible. To be efficiently used as a molecular sieve, the structure of the zeolite after complete dehydration must remain intact.

There has been considerable interest in developing metallosilicates other than aluminosilicates which exhibit molecular sieve characteristics. For example, U.S. Pat. Nos. 3,329,480 and 3,329,481 disclose crystalline zircano-silicates and titano-silicates, respectively. U.S. Pat. No. 3,329,384 discloses group IV-B metallosilicates. U.S. Pat. Nos. 4,208,305, 4,238,315 and 4,337,176 disclose iron silicates. U.S. Pat. No. 4,329,328 discloses zinco-, stanno-, and titano-silicates. European patent applications Nos. 0 038 682 and 0 044 740 disclose cobalt silicates. European patent application No. 0 050 525 discloses nickel silicate.

U.K. patent application No. GB 2,024,790 A discloses a silica-based material which has been modified with one or more elements which have entered the crystalline lattice of the silica in place of silicon atoms of the silica or in the form of salts of bisilicic or polysilicic acids. The elements identified as being suitable for making such silica-based materials are chromium, beryllium, titanium, vanadium, manganese, iron, cobalt, zinc, zirconium, rhodium, silver, tin, antimony and boron.

U.S. Pat. No. 4,299,808 discloses chromosilicates formed by reacting an aqueous mixture of an oxide of silicon, a compound of chromium, a hydroxide of an alkali or an alkaline earth metal, and an alkylammonium cation or a precursor of an alkylammonium cation.

There remains a need for a suitable method for preparing metallosilicates that exhibit molecular sieve character whereby the metal is introduced into the crystalline structure in a direct, efficient and primary fashion. Such a method would preferably involve introducing the metal in the original synthesis mixture.

SUMMARY OF THE INVENTION

The present invention relates to a method for making crystalline metallosilicates which exhibit molecular sieve character. An advantage of the method of the present invention is that the metal is introduced into the crystalline structure in a direct, efficient and primary fashion. That is, the metal is introduced in the original synthesis mixture.

Broadly stated, the present invention contemplates the provision of a method for preparing a molecular sieving metallosilicate comprising (A) providing a mixture comprising water; an oxide of silicon source; a mineralizing agent and/or synthesis directing agent; and a heteropolymetallate of the formula

wherein
A is an ion selected from the group consisting of hydrogen; one or more of the Group I-A to VI-A or Group I-B to VII-B metals; one or more of the rare earth metals; ammonium, alkyl ammonium, alkyl phosphonium or alkyl arsonium; or a mixture of two or more thereof;

M is Zn, Ga, Ge, Ti, Cr, Mn, Fe, Co, B, Ni, Rh, Zr or a mixture of two or more thereof;

L is P, As, Si, Al, H or a mixture of two or more thereof;

J is Mo, W, V, Nb or a mixture of two or more thereof;

a is a number which when multiplied by the charge of A will result in balancing the charge on the complex within the brackets;

l is a number ranging from zero to about 20;

m is a number ranging from zero to about 20;

z is a number ranging from about 1 to about 50;

y is a number ranging from about 7 to about 150;

d is a number ranging from zero to about 150; and (B) maintaining said mixture at a temperature of about 80° C. to about 300° C. for an effective period of time to form said molecular sieving metallosilicate.

DETAILED DESCRIPTION OF THE PREFERRED EMBODIMENT

The mixture provided for in step (A) of the process of the invention is preferably prepared in three steps. First, the oxide of silicon source and the mineralizing and/or synthesis directing agent are mixed in water to provide a first mixture. This first mixture is preferably in the form of a colloidal dispersion. Second, the heteropolymetallate is mixed with water and optionally a base (e.g., alkali or alkaline earth metal hydroxide, preferably sodium or potassium hydroxide) to provide a second mixture. This second mixture is usually in the form of a dispersion or solution. Third, the first and second mixtures described above are mixed together to form a third mixture.

This third mixture which is in the form of a gel is the mixture called for in step (A) of the inventive method. Stirring or agitation is generally required to effect a homogeneous mixture. The Si to heteropolymetallate mole ratio for this third mixture is preferably in the range of about 20 to about 100. The $OH^-$ to Si mole ratio is preferably in the range of about 0.1 to about 10. The $H_2O$ to $OH^-$ mole ratio is preferably in the range of about 10 to about 1000. The Si to mineralizing agent and/or synthesis directing agent mole ratio is preferably in the range of about 0.1 to about 30.

The oxide of silicon source can be any source that provides silicon oxide, hydroxide or alkoxide. Such sources include silica gel, silicic acid, silica sol and the silicates. Included within the silicates are the alkali and alkaline earth metal silicates with sodium silicate and potassium silicate being preferred. The alkoxides include those alkoxides of up to about 10, preferably up to about 6 carbon atoms. The silica sols are aqueous colloidal dispersions containing colloidal silica particles. The solids content of these colloidal dispersions generally ranges up to about 70% by weight, and is preferably in the range of about 5% to about 50%. These dispersions usually include an effective amount of an anionic (e.g., acetate, halogen, etc.) or cationic (e.g., alkali metal, ammonium, etc.) stabilizing agent to stabilize the dispersion. Generally the level of addition of such stabilizing agents is up to about 10% by weight of the solids in the dispersion. A commercially available silica sol which is particularly useful is Ludox AS-40 which is a product of DuPont identified as an ammonium stabilized silica sol containing 40% by weight silica.

The mineralizing agent and/or synthesis directing agent is provided in an effective amount to assist in forming the gel provided for in step (A) of the process of the invention. Some of these agents are believed to function as templating agents. These mineralizing or synthesis directing agents can be the cation of an amine or alkanol amine compound, alkyl substituted amine or alkyl substituted alkanol amine compound, ammonium or alkyl ammonium compound, alkali or alkaline earth metal compound, or alkyl phosphonium or alkyl arsonium compound. Alkyl groups have up to about six carbon atoms. The alkyl ammonium, alkyl phosphonium and alkyl arsonium compounds can be mono-, di-, tri- or tetra-alkyl compounds. In cases wherein more than one alkyl group is present, the alkyl groups can be the same or different. These compounds include the oxides, hydroxides, inorganic salts (e.g., nitrates, phosphates, sulfates, halides, carbonates, and the like) as well as the organic salts, (e.g., acetates, formates, butyrates, propionates, benzylates and the like). Preferred alkyl ammonium compounds are the tetraalkyl- (e.g., tetrapropyl) ammonium hydroxides and halides (e.g., bromide). The alkali and alkaline earth metal compounds include sodium, potassium and calcium hydroxide. The amines, alkyl substituted amines, alkanol and alkyl substituted alkanol amines include primary, secondary and tertiary mono- and poly-amines of up to about six carbon atoms. The alkanol amines and alkyl substituted alkanol amines can be monohydric or polyhydric. Examples include methyl- and ethyl amine, dimethyl- and diethyl-amine, trimethyl- and triethyl amine, diethylmethyl amine, 2-hydroxyethylamine, 3-hydroxybutyl amine, diethanolamine, diethylethanol amine, di-(2-hydroxypropyl amine), N,N,N'-tri-(hydroxy methyl)ethylene-diamine, etc.

The heteropolymetallates can be represented by the formula $$A_a[L_lM_mJ_zO_y]\cdot dH_2O$$

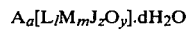

wherein

A is an ion selected from the group consisting of hydrogen; one or more of the Group I-A to VI-A or I-B to VI-B metals; one or more of the rare earth metals; ammonium, alkyl ammonium, alkyl phosphonium or alkyl arsonium; or a mixture of two or more thereof;

M is Zn, Ga, Ge, Ti, Cr, Mn, Fe, Co, B, Ni, Rh, Zr or a mixture of two or more thereof;

L is P, As, Si, Al, H or a mixture of two or more thereof;

J is Mo, W, V, Nb or a mixture of two or more thereof;

a is a number which when multiplied by the valence of A will result in balancing the charge on the complex within the brackets;

l is a number ranging from zero to about 20, preferably from zero to about 2;

m is a number ranging from zero to about 20, preferably from zero to about 6;

z is a number ranging from about 1 to about 50, preferably from about 6 to about 12;

y is a number ranging from about 7 to about 150, preferably from about 24 to about 40; and d is a number ranging from zero to about 150, preferably from about 6 to about 75;

A is preferably H, Na, K, $NH_4$ or a mixture thereof. M is preferably Ni, Mn, Zn, Ti, Co or Cr. L is preferably H or P. J is preferably Mo or W. The alkyl groups on the alkyl ammonium, alkyl phosphonium and alkyl arsonium can each have up to about 6 carbon atoms. The alkyl ammonium, alkyl phosphonium and alkyl arsonium compounds can be mono-, di-, tri- or tetra-alkyl compounds. When more than one alkyl group is present, they can be the same or different.

In a preferred embodiment L is H; M is Mn, Fe, Co, Ni, Zn, Ga or Rh; J is Mo; l is 6, z is 6, y is 24 and m is 1. In another preferred embodiment L is H; l is 6; J is W; z is 6; y is 24; M is Ni; and m is 1. In still another preferred embodiment l is zero; J is W; z is 6; y is 24; M is Mn or Ni; and m is 1. In still another preferred embodiment l is zero; J is W; z is 11; y is 39; M is B, Ga, Fe, Co or Zn; and m is 1. In still another preferred embodiment l is zero; J is W; z is 12; y is 40; M is B, Ga, Ge, Cr, Mn, Fe, Co or Zn; and m is 1. In still another preferred embodiment l is zero; J is Mo; z is 12; y is 40; M is Ge, Zr or Ti; and m is 1. In still another preferred embodiment l is zero; J is Mo; z is 9; y is 32; M is Mn or Ni; and m is 1. In still another preferred embodiment l is zero; J is Mo; z is 10; y is 36; M is Co; and m is 2.

Exemplary heteropolymetallates that are useful include $(NH_4)_6[Co_2Mo_{10}O_{36}]\cdot 18H_2O$, $(NH_4)_3[FeMo_6O_{24}H_6]\cdot 6H_2O$, $(NH_4)_4[NiMo_6O_{24}H_6]\cdot 6H_2O$, $(NH_4)_6[NiMo_9O_{32}]\cdot 6.5H_2O$, and $(NH_4)_3[CrMo_6O_{24}H_6]\cdot 6H_2O$.

In the method of the present invention, the mixture called for in step (A) of the inventive method (i.e., the above indicated third mixture) containing water, the oxide of silicon source, mineralizing agent and/or synthesis directing agent, and heteropolymetallate, is thoroughly mixed and then placed in a reactor. The reactor is preferably an enclosed reactor (e.g., a static bomb style reactor). The contents are heated to a temperature in the range of about 80° C. to about 300° C., preferably about 125° C. to about 200° C., for an effective period of time to form the desired molecular sieving metallosilicate, preferably about 4 hours to about 30 days, more preferably about one to about ten days. The pressure within the reactor is preferably at least the vapor pressure of water at the temperature of the reactor contents. The contents of the reactor are then allowed to cool to room temperature. The crystalline solids are separated from the mother liquor and washed thoroughly with water. Separation can be effected by conventional filtration techniques. An advantage of the invention is that simplified filtration techniques (i.e., centrifuge and similar techniques are not necessary) can be used due to the efficient crystallization that takes place. The solids can also be washed with water and optionally an acid solution, e.g., 10% hydrochloric acid solution. The crystalline solids are then allowed to dry in air, such solids being the desired molecular sieving metallosilicates of the invention.

The metallosilicates prepared in accordance with the invention can be represented in terms of mole ratios by the formula

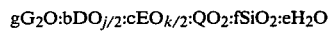
$gG_2O:bDO_{j/2}:cEO_{k/2}:QO_2:fSiO_2:eH_2O$ wherein

G is a hydrogen, ammonium, alkyl ammonium, alkyl phosphonium or alkyl arsonium ion, or a mixture thereof with each of the alkyl groups having up to about 6 carbon atoms; G is preferably hydrogen, ammonium, tetraalkyl (e.g., tetrapropyl) ammonium or a mixture of two or more thereof;

D is an alkali or alkaline earth metal ion, or a mixture of two or more thereof; preferably Li, Na, K or a mixture of two or more thereof;

E is Al, Mo, W or a mixture of two or more thereof;

Q is selected from the group consisting of Zn, Ga, Ge, Ti, Cr, Mn, Fe, Co, B, Ni, Rh, Zr or a mixture of two or more thereof; preferably Zn, Ti, Cr, Fe, Co, Ni or a mixture of two or more thereof;

g is a number ranging from zero to about 25, preferably from zero to about 12;

b is a number ranging from zero to about 5, preferably from zero to about 3;

c is a number ranging from zero to about 0.4, preferably from zero to about 0.2;

f is a number ranging from about 10 to about 500, preferably from about 20 to about 100;

e is a number ranging from zero to about 200, preferably from zero to about 80;

j is the valence of D; and k is the valence of E.

These metallosilicates preferably possess a definite distinguishing crystalline structure whose X-ray diffraction pattern shows at least the following significant lines:

TABLE I

| Interplanar Spacing d(A) | Relative Intensity |
| --- | --- |
| 11.1 ± 0.2 | s. |
| 10.0 ± 0.2 | m.–s. |
| 7.45 ± 0.15 | w. |
| 6.35 ± 0.01 | w. |
| 4.61 ± 0.08 | w. |
| 3.84 ± 0.08 | s. |
| 3.73 ± 0.05 | s. |
| 3.65 ± 0.05 | m.–s. |
| 3.05 ± 0.03 | w. |
| 2.99 ± 0.02 | w. |
| 2.00 ± 0.02 | w. |

The values were determined by standard techniques. In Table I, the relative intensities are given in terms of symbols: s.=strong, m.=medium, and w.=weak.

The metallosilicates can be heat treated at a temperature of about 300° C. to about 900° C., preferably about 400° C. to about 600° C. in an inert, oxidizing or reducing atmosphere for a sufficient time to pyrolyze any synthesis directing agent intermixed with such metallosilicates. The time period for this heat treating step is dependent upon the mass of material being treated. Preferably the heat treating step is conducted for at least about 30 minutes, but this time period can be more or less than 30 minutes depending upon the mass of material being treated. The inert atmosphere is preferably nitrogen, argon, helium or neon. The reducing atmosphere is hydrogen or a mixture of hydrogen and one of the above-indicated inert gases. The reducing atmosphere can thus contain from about 1% to about 100% hydrogen, preferably about 1% to about 20% hydrogen, with the remainder being inert gas. The oxidizing atmosphere can be oxygen or a mixture of oxygen and one of the above-indicated inert gases. The oxidizing atmosphere can thus contain from about 1% to about 100% oxygen, preferably from about 1% to about 20% oxygen with the remainder being inert gas. A preferred oxidizing atmosphere is air. The X-ray diffraction pattern for these heat treated metallosilicates shows the following significant lines:

| Interplanar Spacing d(A) | Relative Intensity |
| --- | --- |
| 11.2 ± 0.2 | s. |
| 10.2 ± 0.2 | s. |
| 9.8 ± 0.2 | m. |
| 6.74 ± 0.1 | w. |
| 6.38 ± 0.1 | w. |
| 6.01 ± 0.08 | w. |
| 5.75 ± 0.08 | w. |
| 5.61 ± 0.08 | w. |
| 4.38 ± 0.06 | w. |
| 3.86 ± 0.05 | s. |
| 3.84 ± 0.05 | s. |
| 3.73 ± 0.05 | s. |
| 3.66 ± 0.04 | w.–m. |
| 3.00 ± 0.02 | w. |
| 2.015 ± 0.01 | w. |
| 1.995 ± 0.01 | w. |

The metallosilicates produced in accordance with the invention can be cation exchanged with an ammonium salt or a salt of a catalytically active metal. The salt of a catalytically active metal is preferably the salt of a Group VIII, IB or IIB metal, with zinc, copper, nickel, cobalt and iron being preferred. The anionic portions of these salts are preferably inorganic and include the nitrates, phosphates, sulfates, carbonates and halides, but can also include organics such as acetates. The cation exchange procedure employed herein is entirely conventional. Briefly, the metallosilicate and the ammonium salt or salt of catalytically active metal are dispersed in water for a few minutes to several hours, preferably about one to about ten hours, and maintained at about room temperature to about the boiling point of the water, then filtered and washed. This exchange procedure can be carried out once or repeatedly depending on the degree of exchange required.

Optionally the cation-exchanged metallosilicate can be heat treated in an inert, oxidizing or reducing atmosphere using the heat treating procedures described above to convert the cation-exchanged species to a more active form. This heat treating procedure is particularly suitable for driving off ammonia from an ammonium-metallosilicate to convert such metallosilicate to the acid form.

An advantage of the present invention is that the metallosilicates produced therefrom exhibit improved crystallinity over metallosilicates produced in accordance with prior art methods wherein the metals of such prior art methods are derived from simple metal salts rather than the heteropolymetallates required by the present invention. The metallosilicates produced herein are generally in excess of about one micron in size while those of such prior art methods are often less than about one micron in size. Thus the morphology of the crystals produced in accordance with the present invention is significantly improved over the crystals produced in accordance with prior art methods.

The metallosilicates prepared in accordance with the present invention can be used in many of the known applications for zeolites and molecular sieves. The crystalline structure of these metallosilicates make them particularly suitable as catalysts for converting methanol to liquid hydrocarbon fuels and for upgrading synthesis gas. These metallosilicates are also useful in xylene isomerizations and ethyl benzene synthesis.

In order to further illustrate the present invention, the following examples are provided. Unless otherwise indicated, in the following examples as well as throughout the specification and in the claims, all parts and percentages are by weight, and all temperatures are in degrees centigrade.

EXAMPLE 1

29.6 parts of Ludox AS-40 (a product of DuPont identified as an ammonium stabilized 40% silica sol), and 2.7 parts of tetrapropyl ammonium bromide were mixed in a polypropylene beaker to form a first mixture. 2.4 parts of $(NH_4)_6[Co_2Mo_{10}O_{36}]\cdot 18H_2O$ were mixed with 13.0 parts of water with stirring in another polypropylene beaker to form a second mixture. 5.0 parts of a 50% sodium hydroxide solution were added to the second mixture. The two mixtures were mixed together with the result being the formation of a gel. The gel was stirred for five minutes to homogenize the gel. The Si/Mo mole ratio was 16. The Si/Co mole ratio was 79. The Si/Na mole ratio was 3.15. The mixture was divided into five equal samples, and each sample was placed in a Teflon-lined stainless steel bomb. The bombs were placed in an oven at a temperature of 175° C. The samples were recovered at 42 hours, 6 days, 8 days, 10 days and 20 days. The solids were separated from the mother liquor by filtering through a Buchner filter. The solids were washed in water. The solid samples received at 42 hours, 6 days and 8 days were observed to exhibit X-ray diffraction patterns suggesting pentasil structures. The 10-day and 20-day samples were observed to exhibit both pentasil and alpha-quartz structures. The 10-day sample contained less than 2% quartz, while the 20-day sample contained about 20% quartz. The X-ray diffraction pattern for the 42-hour sample exhibited the following significant lines:

| Interplanar Spacing d(A) | Relative Intensity |
| --- | --- |
| 11.3 | s. |
| 10.0 | m. |
| 7.50 | w. |
| 6.39 | w. |
| 4.62 | w. |
| 3.86 | s. |
| 3.77 | m. |
| 3.74 | s. |
| 3.66 | m. |
| 3.45 | w. |
| 2.99 | w. |
| 2.01 | w. |
| 1.99 | w. |

EXAMPLE 2

11.84 parts of Ludox AS-40 and 1.08 parts of tetrapropyl ammonium bromide were mixed in a polypropylene beaker to form a first mixture. 0.96 parts of $(NH_4)_3[FeMo_6O_{24}H_6]\cdot 6H_2O$ were mixed with 5.2 parts of water with stirring in another polypropylene beaker to form a second mixture. 2.5 parts of a 50% sodium hydroxide solution were added to the second mixture. The two mixtures were mixed together with the result being the formation of a gel. The gel was stirred for five minutes to homogenize the gel. The Si/Mo mole ratio was 18.4. The Si/Fe mole ratio was 96. The Si/Na mole ratio was 2.5. The mixture was divided into two equal samples, and each sample was placed in a Teflon-lined stainless steel bomb. The bombs were placed in an oven at an temperature of 175° C. The samples were recovered at 66 hours and 10 days. The solids were recovered from the mother liquor by filtering through a Buchner filter. The solids were washed in water. Each sample was observed to exhibit a pentasil structure. The 66-hour sample contained about 10% alpha quartz while the 10-day sample contained about 30% alpha quartz. The X-ray diffraction pattern for the 66-hour sample molecular sieve was as follows:

| Interplanar Spacing d(A) | Relative Intensity |
|---|---|
| 11.25 | s. |
| 10.10 | m. |
| 9.80 | m. |
| 7.55 | w. |
| 6.38 | w. |
| 4.62 | w. |
| 3.86 | s. |
| 3.77 | m. |
| 3.73 | s. |
| 3.66 | m. |
| 3.45 | w. |
| 2.99 | w. |
| 2.00 | w. |

EXAMPLE 3

11.84 parts of Ludox AS-40 and 1.08 parts of tetrapropyl ammonium bromide were mixed in a polypropylene beaker to form a first mixture. 0.96 parts of $(NH_4)_4[NiMo_6O_{24}H_6]\cdot 6H_2O$ were mixed with 5.2 parts of water with stirring in another polypropylene beaker to form a second mixture. 2.5 parts of a 50% sodium hydroxide solution were added to the second mixture. The two mixtures were mixed together with the result being the formation of a gel. The gel was stirred for five minutes to homogenize the gel. The Si/Mo mole ratio was 18.4. The Si/Ni mole ratio was 96.2. The Si/Na mole ratio was 2.5. The mixture was divided into two equal samples, and each sample was placed in a Teflon-lined stainless steel bomb. The bombs were placed in an oven at a temperature of 175° C. The samples were recovered at 66 hours and 10 days. The solids were recovered from the mother liquor by filtering through a Buchner filter. The solids were washed in water. Each sample was observed to exhibit a pentasil structure. The 10-day sample also contained about 30% alpha-quartz. The X-ray diffraction pattern for the 66-hour sample contained the following significant lines:

| Interplanar Spacing d(A) | Relative Intensity |
|---|---|
| 11.2 | s. |
| 10.0 | m. |
| 9.8 | m. |
| 7.50 | w. |
| 6.40 | w. |
| 4.62 | w. |
| 3.85 | s. |
| 3.76 | m. |
| 3.71 | s. |
| 3.65 | s. |
| 3.44 | w. |
| 2.98 | w. |
| 2.005 | w. |
| 1.998 | w. |

EXAMPLE 4

11.84 parts of Ludox AS-40 and 1.08 parts of tetrapropyl ammonium bromide were mixed in a polypropylene beaker to form a first mixture. 0.96 parts of $(NH_4)_6[NiMo_9O_{32}]\cdot 6.5H_2O$ were mixed with 5.2 parts of water with stirring in another polypropylene beaker to form a second mixture. 2.5 parts of a 50% sodium hydroxide solution were added to the second mixture. The two mixtures were mixed together with the result being the formation of a gel. The gel was stirred for five minutes to homogenize the gel. The Si/Mo mole ratio was 10.4. The Si/Ni mole ratio was 93.5. The Si/Na mole ratio was 2.52. The mixture was divided into two equal samples, and each sample was placed in a Teflon-lined stainless steel bomb. The bombs were placed in an oven at a temperature of 175° C. The samples were recovered at 72 hours and 10 days. The solids were recovered from the mother liquor by filtering through a Buchner filter. The soilds were washed in water. Each sample was observed to exhibit a pentasil structure. The 10-day sample contained about 25% alpha quartz. The X-ray diffraction pattern for the 72-hour sample contained the following significant lines:

| Interplanar Spacing d(A) | Relative Intensity |
|---|---|
| 11.3 | s. |
| 10.2 | s. |
| 9.9 | m. |
| 7.50 | w. |
| 6.40 | w. |
| 4.63 | w. |
| 3.86 | s. |
| 3.77 | m. |
| 3.73 | s. |
| 3.67 | s. |
| 3.45 | w. |
| 2.99 | w. |
| 2.010 | w. |
| 1.999 | w. |

EXAMPLE 5

11.8 parts of Ludox AS-40 and 1.10 parts of tetrapropyl ammonium bromide were mixed in a polypropylene beaker to form a first mixture. 1.0 parts of $(NH_4)_3[CrMo_6O_{24}H_6]\cdot 6H_2O$ were mixed with 5.2 parts of water with stirring in another polypropylene beaker to form a second mixture. 2.0 parts of a 50% sodium hydroxide solution were added to the second mixture. The two mixtures were mixed together with the result being the formation of a gel. The gel was stirred for five minutes to homogenize the gel. The Si/Mo mole ratio was 15.7. The Si/Cr mole ratio was 94.1. The Si/Na mole ratio was 3.14. The mixture was divided into two equal samples, and each sample was placed in a Teflon-lined stainless steel bomb. The bomb with the first sample was placed in an oven at a temperature of 175° C. for 66 hours and then recovered. The bomb with the second sample was maintained at room temperature for four days, then placed in an oven at 175° C. for 66 hours and then recovered. The solids were recovered from the mother liquor by filtering through a Buchner filter. The solids were washed in water. Each of the samples was observed to exhibit a pentasil structure. The X-ray diffraction pattern for these samples was as follows:

| Interplanar Spacing d(A) | Relative Intensity |
|---|---|
| 11.3 | s. |
| 10.2 | s. |
| 9.8 | m. |
| 7.50 | w. |
| 6.40 | w. |

| Interplanar Spacing d(A) | Relative Intensity |
| --- | --- |
| 4.62 | w. |
| 3.85 | s. |
| 3.76 | m. |
| 3.72 | s. |
| 3.66 | m. |
| 3.44 | w. |
| 2.98 | w. |
| 2.010 | w. |
| 1.992 | w. |

The elemental analysis for the first sample was as follows: 37% Si; 1.60% Na; 0.90% Cr; and 0.02% Mo. The mole ratios for the first sample were: Si/Cr=78; Na/Cr=4.1; and Mo/Cr=0.01.

The elemental analysis for the second sample was as follows: 38.4% Si; 0.053% Al; 1.5% Na; 0.74% Cr; and 0.13% Mo. The mole ratios for the second sample were: Si/Cr=98; Al/Cr=0.14; Na/Cr=4.7; and Mo/Cr=0.07.

EXAMPLE 6

29.6 parts of Ludox AS-40 and 2.7 parts of tetrapropyl ammonium bromide were mixed in a polypropylene beaker to form a first mixture. 2.4 parts of $(NH_4)_6[Co_2Mo_{10}O_{36}] \cdot 18H_2O$ were mixed with 13.0 parts of water with stirring in another polypropylene beaker to form a second mixture. 5.0 parts of a 50% sodium hydroxide solution were added to the second mixture. The two mixtures were mixed together with the result being the formation of a gel. The gel was stirred for five minutes to homogenize the gel. The Si/Mo mole ratio was 15.9. The Si/Co mole ratio was 78.8. The Si/Na mole ratio was 3.15. The mixture was divided into three equal samples, and each sample was placed in a Teflon-lined stainless steel bomb. The bombs were placed in an oven at a temperature of 150° C. The samples were recovered at 66 hours, 8 days and 15 days. The solids were recovered from the mother liquor by filtering through a Buchner filter. The solids were washed in water. Each of the samples was observed to exhibit a pentasil structure. The X-ray diffraction pattern for these samples exhibited the following significant lines:

| Interplanar Spacing d(A) | Relative Intensity |
| --- | --- |
| 11.3 | s. |
| 10.2 | s. |
| 9.8 | m. |
| 7.50 | w. |
| 6.40 | w. |
| 4.62 | w. |
| 3.86 | s. |
| 3.78 | m. |
| 3.73 | s. |
| 3.66 | m. |
| 3.45 | w. |
| 2.99 | w. |
| 2.010 | w. |
| 1.995 | w. |

The elemental analysis for the 15-day sample was as follows: 36% Si; 0.039% Al; 0.97% Na; 0.85% Co; and 0.056% Mo. The mole ratios for the 15-day sample were: Si/Co=91; Al/Co=0.10; Na/Co=2.99; and Mo/Co=0.04.

EXAMPLE 7

11.84 parts of Ludox AS-40 and 1.08 parts of tetrapropyl ammonium bromide were mixed in a polypropylene beaker to form a first mixture. 0.96 parts of $(NH_4)_3[FeMo_6O_{24}H_6] \cdot 6H_2O$ were mixed with 5.2 parts of water with stirring in another polypropylene beaker to form a second mixture. 2.5 parts of a 50% sodium hydroxide solution were added to the second mixture. The two mixtures were mixed together with the result being the formation of a gel. The gel was stirred for five minutes to homogenize the gel. The Si/Mo mole ratio was 18.4. The Si/Fe mole ratio was 96. The Si/Na mole ratio was 2.5. The mixture was divided into two equal samples, and each sample was placed in a Teflon-lined stainless steel bomb. The bombs were placed in an oven at a temperature of 150° C. The samples were recovered at 6 days and 13 days. The solids were recovered from the mother liquor by filtering through a Buchner filter. The solids were washed in water. Each of the samples was observed to exhibit a pentasil structure. The 6-day sample contained about 3% alpha quartz while the 13-day sample contained about 10% alpha quartz. The X-ray diffraction pattern for the 6-day sample contained the following significant lines:

| Interplanar Spacing d(A) | Relative Intensity |
| --- | --- |
| 11.3 | s. |
| 10.2 | m. |
| 9.85 | w. |
| 7.50 | w. |
| 6.40 | w. |
| 4.63 | w. |
| 3.86 | s. |
| 3.77 | m. |
| 3.74 | s. |
| 3.67 | m. |
| 3.45 | w. |
| 2.99 | w. |
| 2.010 | w. |
| 1.998 | w. |

The elemental analysis for the 6-day sample was as follows: 38% Si; 0.027% Al; 0.46% Na; 1.2% Fe; and 0.014% Mo. The mole ratios for this sample were: Si/Fe=64; Al/Fe=0.05; Na/Fe=1.0; and Mo/Fe=0.007.

EXAMPLE 8

One part of the solids recovered from the 66-hour sample of Example 2 was dried for 2 hours at 150° C. and then heat treated in air at 500° C. for four hours. The sample was cooled to room temperature and exhibited the following significant lines in its X-ray diffraction pattern (in addition to strong lines at 4.28 and 3.36 due to alpha quartz):

| Interplanar Spacing d(A) | Relative Intensity |
| --- | --- |
| 11.3 | s. |
| 10.2 | s. |
| 9.8 | m. |
| 6.78 | w. |
| 6.41 | w. |
| 6.06 | w. |
| 5.78 | w. |
| 5.61 | w. |
| 4.39 | w. |
| 3.88 | s. |
| 3.85 | s. |
| 3.77 | m. |

-continued

| Interplanar Spacing d(A) | Relative Intensity |
|---|---|
| 3.74 | s. |
| 3.66 | w. |
| 3.00 | w. |
| 2.015 | w. |
| 1.998 | w. |

EXAMPLE 9

One part of the solids recovered from the 72-hour sample of Example 4 was dried for 2 hours at 150° C. and then heat treated in air at 500° C. for four hours. The sample was cooled to room temperature and exhibited the following significant lines in its X-ray diffraction pattern:

| Interplanar Spacing d(A) | Relative Intensity |
|---|---|
| 11.3 | s. |
| 10.2 | s. |
| 9.9 | m. |
| 6.76 | w. |
| 6.40 | w. |
| 6.06 | w. |
| 5.78 | w. |
| 5.62 | w. |
| 4.39 | w. |
| 3.87 | s. |
| 3.85 | s. |
| 3.74 | s. |
| 3.68 | m. |
| 3.65 | m. |
| 3.00 | w. |
| 2.015 | w. |
| 1.992 | w. |

EXAMPLE 10

One part of the solids recovered from the 66-hour sample of Example 5 was dried for 2 hours at 150° C. and then heat treated in air at 500° C. for four hours. The sample was cooled to room temperature and exhibited the following significant lines in its X-ray diffraction pattern:

| Interplanar Spacing d(A) | Relative Intensity |
|---|---|
| 11.3 | s. |
| 10.1 | s. |
| 9.8 | m. |
| 6.75 | w. |
| 6.40 | w. |
| 6.04 | w. |
| 5.74 | w. |
| 5.60 | w. |
| 4.38 | w. |
| 3.86 | s. |
| 3.84 | s. |
| 3.76 | m. |
| 3.73 | s. |
| 3.66 | w. |
| 3.00 | w. |
| 2.015 | w. |
| 1.998 | w. |

EXAMPLE 11

One part of the solids recovered from the 15-day sample of Example 6 was dried for two hours at 150° C. and then heat treated in air at 500° C. for four hours. The sample was cooled to room temperature and exhibited the following significant lines in its X-ray diffraction pattern:

| Interplanar Spacing d(A) | Relative Intensity |
|---|---|
| 11.3 | s. |
| 10.1 | s. |
| 9.8 | m. |
| 6.72 | w. |
| 6.38 | w. |
| 6.01 | w. |
| 5.75 | w. |
| 5.60 | w. |
| 4.38 | w. |
| 3.86 | s. |
| 3.84 | s. |
| 3.76 | m. |
| 3.73 | s. |
| 3.67 | w. |
| 2.99 | w. |
| 2.010 | w. |
| 1.992 | w. |

EXAMPLE 12

One part of the solids recovered from the 15-day sample of Example 6 was dried for two hours at 150° C. and then heat treated under a nitrogen blanket at 500° C. for four hours. The sample was cooled to room temperature and exhibited the following significant lines in its X-ray diffraction pattern:

| Interplanar Spacing d(A) | Relative Intensity |
|---|---|
| 11.3 | s. |
| 10.2 | s. |
| 9.9 | m. |
| 6.75 | w. |
| 6.40 | w. |
| 6.04 | w. |
| 5.78 | w. |
| 5.60 | w. |
| 4.38 | w. |
| 3.87 | s. |
| 3.84 | s. |
| 3.76 | m. |
| 3.73 | s. |
| 3.66 | w. |
| 2.995 | w. |
| 2.015 | w. |
| 1.998 | w. |

EXAMPLE 13

0.7 parts of a cobalt silicate produced in accordance with the procedures used in preparing the 8-day sample of Example 6 were placed in a 300 ml. autoclave with 7 parts of methanol. The autoclave was heated to 300° C. for one hour. The autoclave was vented at 300° C. Liquid product was recovered by condensing vapors from the autoclave with ice at 0° C. The liquid product contained 45% dimethyl ether, about 5% unreacted methanol and the balance was water. An analysis of the effluent gas, which represented the reaction product of about 0.6 parts of the methanol originally charged to the autoclave, is indicated in the following table:

TABLE

| | Weight % |
|---|---|
| Methane | 16.1 |
| Ethylene/Ethane | 4.3 |
| Propane | 7.5 |

TABLE-continued

| | Weight % |
|---|---|
| Propylene | 1.9 |
| Iso-butene | 3.4 |
| n-butene | 2.2 |
| CO$_2$ | 41.0 |
| CO | 23.6 |

This gas phase distribution of products reflects the activity of the cobalt silicate in a methanol dehydrating and reforming reaction.

While the invention has been explained in relation to its preferred embodiment, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for preparing a molecular sieving metallosilicate comprising
   (A) providing a mixture comprising: water; an oxide of silicon source; a mineralizing agent and/or synthesis directing agent; and a heteropolymetallate of the formula $$A_a[L_l M_m J_z O_y] \cdot dH_2O$$

wherein
   A is an ion selected from the group consisting of hydrogen; one or more of the Group I-A to VI-A or Group I-B to VI-B metals; one or more of the rare earth metals; ammonium, alkyl ammonium, alkyl phosphonium or alkyl arsonium; or a mixture of two or more thereof;
   M is Zn, Ga, Ge, Ti, Cr, Mn, Fe, Co, B, Ni, Rh, Zr or a mixture of two or more thereof;
   L is P, As, Si, Al, H or a mixture of two or more thereof;
   J is Mo, W, V, Nb or a mixture of two or more thereof;
   a is a number which when multiplied by the charge of A will result in balancing the charge on the complex within the brackets;
   l is a number ranging from zero to about 20;
   m is a number ranging from zero to about 20;
   z is a number ranging from about 1 to about 50;
   y is a number ranging from about 7 to about 150;
   d is a number ranging from about zero to about 150; and
   (B) maintaining said mixture at a temperature of about 80° C. to about 300° C. for an effective period of time to form said molecular sieving metallosilicate.

2. The method of claim 1 with the step of separating said metallosilicate from its mother liquor.

3. The method of claim 1 with the step of washing said metallosilicate.

4. The method of claim 1 with the step of heat treating said metallosilicate in an inert, oxidizing or reducing atmosphere.

5. The method of claim 4 with step of cation exchanging said heat treated metallosilicate with an ammonium salt or a salt of a catalytically active metal to provide a cation exchanged metallosilicate.

6. The method of claim 5 with the step of heat treating said cation exchanged metallosilicate in an inert, oxidizing or reducing atmosphere.

7. The method of claim 1 wherein the mole ratio during step (A) of Si to heteropolymetallate in the range of about 20 to about 100.

8. The method of claim 1 wherein the mole ratio during step (A) of OH$^-$ to Si is in the range of about 0.1 to about 10.

9. The method of claim 1 wherein the mole ratio during step (A) of H$_2$O to OH$^-$ is in the range of about 10 to about 1000.

10. The method of claim 1 wherein the mole ratio of Si to said mineralizing and/or synthesis directing agent is in the range of about 0.1 to about 30.

11. The method of claim 1 wherein said mineralizing and/or synthesis directing agent is the cation of an amine or alkanol amine compound, ammonium or alkyl ammonium compound, alkali or alkaline earth metal compound, or alkyl phosphonium or alkyl arsonium compound.

12. The method of claim 11 wherein said alkyl ammonium compound is a mono-, di-, tri- or tetra-alkyl ammonium compound, each alkyl group having up to about six carbon atoms.

13. The method of claim 11 wherein said alkyl ammonium compound is a salt or a hydroxide of tetrapropyl ammonium.

14. The method of claim 11 wherein said alkali metal compound is a salt or hydroxide of sodium.

15. The method of claim 1 wherein said mineralizing and/or synthesis directing agent comprises a salt or hydroxide of sodium and a salt or hydroxide of tetrapropylammonium.

16. The method of claim 1 wherein said mixture is maintained in an enclosed container under at least the vapor pressure of water during step (B).

17. The method of claim 1 wherein A is H, Na, K, NH$_4$ or a mixture thereof.

18. The method of claim 1 wherein M is Ni, Mn, Zn, Ti, Co or Cr.

19. The method of claim 1 wherein L is H or P.

20. The method of claim 1 wherein J is Mo or W.

21. The method of claim 1 wherein L is H; M is Mn, Fe, Co, Ni, Zn, Ga or Rh; J is Mo; l is 6, z is 6, y is 24 and m is 1.

22. The method of claim 1 wherein L is H; l is 6; J is W; z is 6; y is 24; M is Ni; and m is 1.

23. The method of claim 1 wherein l is zero; J is W; z is 6; y is 24; M is Mn or Ni; and m is 1.

24. The method of claim 1 wherein l is zero; J is W; z is 11; y is 39; M is B, Ga, Fe, Co or Zn; and m is 1.

25. The method of claim 1 wherein l is zero; J is W; z is 12; y is 40; M is B, Ga, Ge, Cr, Mn, Fe, Co or Zn; and m is 1.

26. The method of claim 1 wherein l is zero; J is Mo; z is 12; y is 40; M is Ge, Zr or Ti; and m is 1.

27. The method of claim 1 wherein l is zero; J is Mo; z is 9; y is 32; M is Mn or Ni; and m is 1.

28. The method of claim 1 wherein l is zero; J is Mo; z is 10; y is 36; M is Co; and m is 2.

29. The method of claim 1 wherein said heteropolymetalate is selected from the group consisting of (NH$_4$)$_6$[Co$_2$Mo$_{10}$O$_{36}$].18H$_2$O, (NH$_4$)$_3$[FeMo$_6$O$_{24}$H$_6$].6H$_2$O, (NH$_4$)$_4$[NiMo$_6$O$_{24}$H$_6$].6H$_2$O, (NH$_4$)$_6$[NiMo$_9$O$_{32}$].6.5H$_2$O, and (NH$_4$)$_3$[CrMo$_6$O$_{24}$H$_6$].6H$_2$O.

30. The method of claim 1 wherein the temperature during step (B) is the range of about 125° C. to about 200° C.

31. The method of claim 1 wherein the time period for step (B) is from about 4 hours to about 30 days.

32. The method of claim 1 wherein the time period for step (B) is from about one to about ten days.

33. The method of claim 1 wherein said metallosilicate can be represented by the formula $$gG_2O:bDO_{j/2}:cEO_{k/2}:QO_2:fSiO_2:eH_2O$$

wherein

G is a hydrogen, ammonium, alkyl ammonium, alkyl phosphonium or alkyl arsonium ion, or a mixture of two or more thereof;

D is an alkali or alkaline earth metal ion, or a mixture of two or more thereof;

E is selected from the group consisting of Al, Mo, W or a mixture of two or more thereof;

Q is selected from the group consisting of Zn, Ga, Ge, Ti, Cr, Mn, Fe, Co, B, Ni, Rh, Zr or a mixture of two or more thereof;

g is a number ranging from zero to about 25;

b is a number ranging from zero to about 5;

c is a number ranging from zero to about 0.4;

f is a number ranging from about 10 to about 500;

e is a number ranging from zero to about 200;

j is the valence of D; and k is the valence of E.

34. The method of claim 33 wherein G is hydrogen, ammonium, tetraalkyl ammonium or a mixture of two or more thereof.

35. The method of claim 33 wherein D is Li, Na, K or a mixture of two or more thereof.

36. The method of claim 33 wherein Q is Zn, Ti, Cr, Fe, Co, Ni or a mixture of two or more thereof.

37. The method of claim 1 wherein the X-ray diffraction pattern for said crystalline metallosilicate shows the following significant lines:

| Interplanar Spacing d(A) | Relative Intensity |
|---|---|
| 11.1 ± 0.2 | s. |
| 10.0 ± 0.2 | m.–s. |
| 7.45 ± 0.15 | w. |
| 6.35 ± 0.10 | w. |
| 4.61 ± 0.08 | w. |
| 3.84 ± 0.08 | s. |
| 3.73 ± 0.05 | s. |
| 3.65 ± 0.05 | m.–s. |
| 3.05 ± 0.03 | w. |
| 2.99 ± 0.02 | w. |
| 2.00 ± 0.02 | w. |

38. The method of claim 4 wherein the X-ray diffraction pattern for said heat treated metallosilicate shows the following significant lines:

| Interplanar Spacing d(A) | Relative Intensity |
|---|---|
| 11.2 ± 0.2 | s. |
| 10.2 ± 0.2 | s. |
| 9.8 ± 0.2 | m. |
| 6.74 ± 0.1 | w. |
| 6.38 ± 0.1 | w. |
| 6.01 ± 0.08 | w. |
| 5.75 ± 0.08 | w. |
| 5.61 ± 0.08 | w. |
| 4.38 ± 0.06 | w. |
| 3.86 ± 0.05 | s. |
| 3.84 ± 0.05 | s. |
| 3.73 ± 0.05 | s. |
| 3.66 ± 0.04 | w.–m. |
| 3.00 ± 0.02 | w. |
| 2.015 ± 0.01 | w. |
| 1.995 ± 0.01 | w. |

* * * * *